United States Patent Office 2,799,114
Patented July 16, 1957

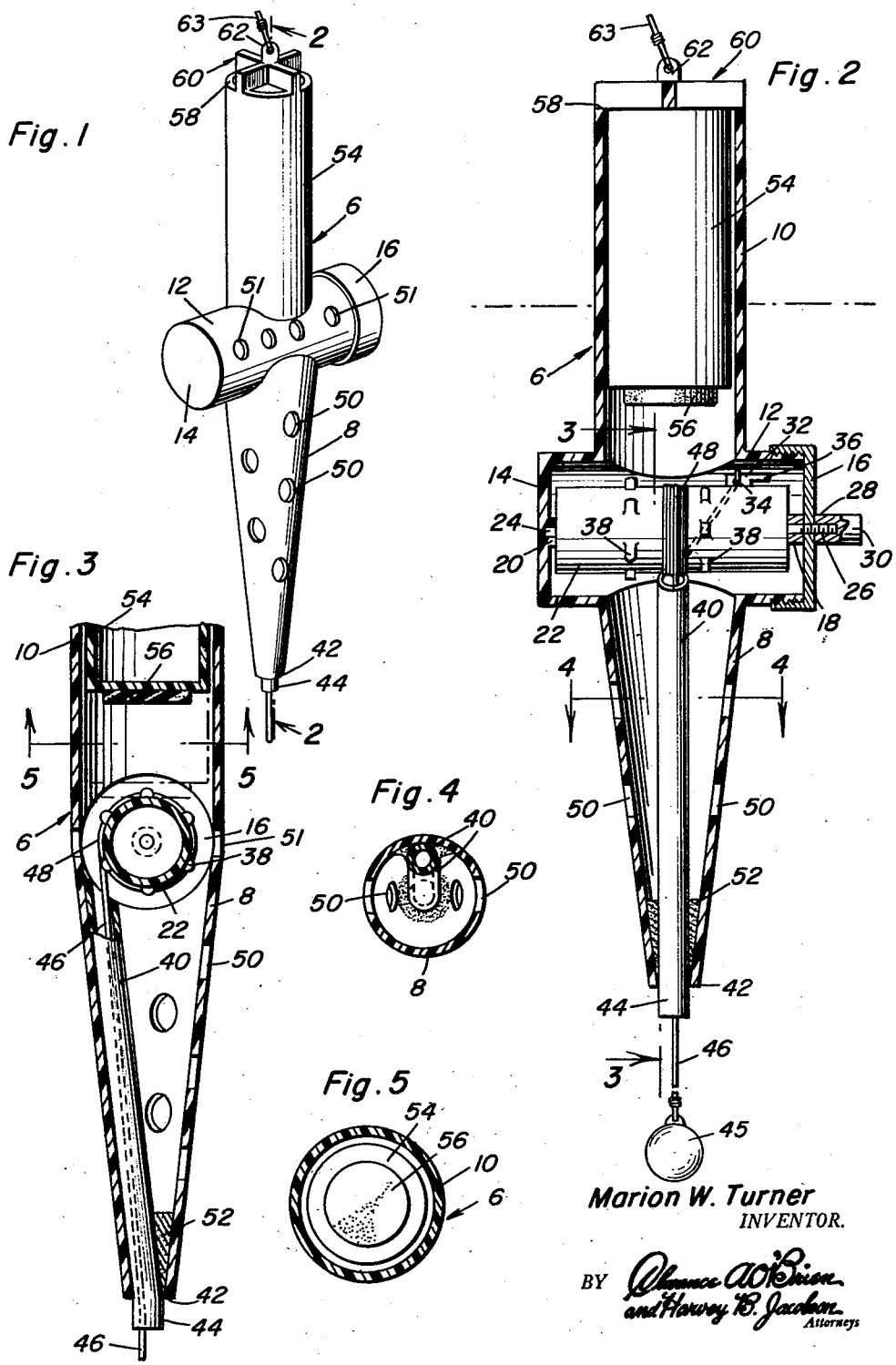

2,799,114

BOBBER WITH REEL AND BRAKE THEREFOR

Marion W. Turner, Concrete, Wash.

Application November 7, 1955, Serial No. 545,150

5 Claims. (Cl. 43—43.11)

This invention relates to an improved fishing device constructed and designed so that a user thereof may use the same for measuring and determining the depth of water at a chosen fishing spot and may thereafter adjust and set a baited fishing line to fish at the desired distance below the surface of the water.

Briefly it comprises a hollow bobber which is attached to a suitable casting line and contains a reel on which the upper end of the baited fishing line is wound. It also contains a reciprocable float movable toward and from the reel. The end of the float next to the reel is provided with a rubber or an equivalent disk which serves as a brake shoe and when engaged with the reel it keeps the reel from turning. When disengaged, it releases and allows the reel to turn freely and the fishing line to unwind and descend to the desired depth in the water. The reel remains stationary during the cast and the fishing line remains wound thereon, but as soon as the bobber comes to rest at the end of the cast the reel is released and the line pays out for use in a now generally well known manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a reel and brake-equipped fishing device embodying the invention;

Figure 2 is a view on an enlarged scale with parts in section and elevation taken on the vertical line 2—2 of Figure 1;

Figure 3 is a fragmentary sectional and elevational view on the approximate same scale taken on the line 3—3 of Figure 2;

Figures 4 and 5 are sections on the lines 4—4 and 5—5 of Figures 2 and 3, respectively.

Although the principal part of the over-all device may be of some other material, moldable commercial plastics, of an appropriate grade, will ordinarily be used. The aforementioned bobber is denoted by the numeral 6 and is elongate and resembles a cross. The lower end portion 8 is tapered and resembles an elongated cone. The upper end portion 10 is axially aligned with the lower end portion 8 and is open ended and cylindrical in cross-section. The median or body portion 12 is interposed between the portions 8 and 10 and is also preferably cylindrical in cross-section. The adjacent end portions of the lower and upper end portions communicate with the body portion 12 intermediate the ends of the latter. The bobber, as an entity, is hollow. The left end of the body portion 12, as shown in Fig. 2, is closed as at 14. The opposite end is open and externally screw threaded to accommodate a readily attachable and detachable screw cap 16. The cap is centrally apertured and on the interior there is a bearing collar 18. Another bearing 20 is provided on the closed end 14. Thus, this capped body provides a housing for a hollow buoyant drum 22 which constitutes the aforementioned reel. This has a journal 24 at one end turnable in the bearing 20 and a journal at the other end turnable in the bearing 18 and terminating in a screw threaded stem 26 to accommodate a nut 28 having a suitable finger grip 30. A cleat 32 is formed on one end portion of the surface of the reel and this has a line hole 34 therein and an extending line anchoring finger 36. The cleat may be compared with a fly nut. Suitable lugs or embossments 38 are provided on the intermediate portion of the surface of the reel. The numeral 40 designates a lengthwise line guide tube which is suitably fixed within the conical lower end portion 8 and the upper end is adjacent to the central portion of the reel and the lower end extends through and beyond the truncated end 42 as at 44. The fishing line, which is suitably baited and provided with a sinker 45 is denoted by the numeral 46. The line extends upwardly through the guide, is wound on the reel at 48, is passed through the hole 34 and in the cleat and is tied there (not detailed). The lower end portion 8 is provided with apertures or water holes 50. There is also a lead bushing 52 or equivalent weight in the lower leading end portion as shown in Figure 2. Not only does the drum 22 serve as a reel, it also functions as a float. The drum 22, journals 24, bearing collar 18, cap 16, stem 26 and knob 28 are permanently assembled as one unit and to remove the reel 22 it is only necessary to remove cap 16 and the entire assembly can be removed as a unit. By preference these parts are assembled during the manufacture of the device and thereafter are kept assembled as a complete unit.

A second float is provided. This is cylindrical and elongated and is denoted by the numeral 54. It is located in the upper end portion 10 and therefore the top portion constitutes a float chamber. This float is reciprocable in the chamber and the lower end thereof is provided with a rubber or equivalent disk member 56 which is movable toward and from the embossments 38 on the reel. The member 56 has disengageable association with the reel and embossments and therefore may be described as a brake shoe. On the upper open end 58 a cruciform spider 60 is intgerally mounted to let the water in and out and this is centrally provided with an apertured ear 62 to accommodate a casting line 63.

In practice the upper end of the fishing line 46 is threaded upwardly through the guide tube 40 and the terminal thereof is threaded through the hole 34 and suitably tied. To do this it is necessary to remove the cap 16 and the reel assembly of the reel housing 12 as previously described. After the end of the line is suitably attached the reel is again inserted into the housing to occupy the position shown and the knob 30 may be grasped between the thumb and index finger of one hand and the reel turned in a manner to wind the line thereon as at 48. The sinker 45 and hook on the lower end of the line prevents the line from being drawn through the guide tube too far.

As before stated the invention is adaptable to practical use as a so-called depth finder. Assuming that the bobber 6 is attached to the end of the casting line 63 by way of the ear 62 the cast is made to the desired spot and the bobber 6 comes to rest on the water. Water enters the holes 50 and 51 and acts on the liftable float 54 whereupon the brake shoe 56 is disengaged from the reel 22, after which the weighted fishing line 46 descends to and settles on the bottom of the body of water. When the sinker 45 strikes the bottom the reel 22 stops turning and the rest of the line remains wound on the reel. After giving the sinker ample time to reach the bottom the device is then rapidly retrieved. This results in pulling it into an angular position and thus allows water to enter through the open top 58 and impinge on the float 54 and re-engage the brake shoe 56 with the reel 22 and lugs 38 on the reel. After the device is lifted from the water the reel remains still. The amount of the line which was thus paid out during this operation is indicative of the depth of the water.

In operating the device for fishing, the fisherman, having determined the depth of the water, he winds as much of the fishing line on the reel as he desires, having chosen the depth, say twenty-five feet, at which he desires to fish below the surface. This is accomplished by taking the reel winding knob 30 between the thumb and forefinger and winding the line on the reel. When the now unwound sinker-equipped end portion of the fishing line reaches the prescribed twenty-five feet, the reel 22 is removed from the reel housing 12 in the previously described manner and the line, at the twenty-five foot point, is placed and held under the cleat or finger 36. This results in limiting the amount of the line which is to be paid out to regulate and control the predetermined twenty-five foot fishing depth. To vary the amount of the fishing line and consequently the depth at which one desires to fish, it is only necessary to vary the location where the fishing line is placed and held under the finger 36.

The weight of the buoyant float 54 and the force resulting in the cast prevents any line from leaving the device until it settles in the water. The device is kept afloat by the buoyant properties of the float 54 as well as the buoyant reel. The lead weight 52 keeps the bobber in a vertical fishing position.

Since certain modifications and changes will readily occur to those skilled in the art, it is not desired to limit the invention to the exact construction shown and described. Accordingly, all suitable modifications and equivalents may be resorted to, falling within the scope of the invention as claimed.

What is claimed as new is as follows:

1. A fishing device which is usable as a depth finder and also for regulating the amount of the line to be used for fishing in a body of water at a predetermined depth comprising a bobber which is adapted to assume a given position in the water, said bobber being elongated and hollow in form, having a lower end portion apertured, having a weight in a lower terminal end and also having a line guiding tube extending therethrough from the upper end portion to and beyond said terminal end; the upper portion of said bobber being imperforate and including a float chamber axially aligned with said lower end portion; the intervening median portion of said bobber having a reel housing; a reel mounted in said housing, a fishing line passing through said guide tube, the lower end of said line carrying a sinker situated below the lower end of said tube, the upper end of said line being detachably connected to said reel and adapted to be wound thereon; and a float adapted to reciprocate in said float chamber and wholly disconnected from said reel, that end of said float which is adjacent to the surface of said reel being provided with media constituting a friction-type brake shoe, and said brake shoe being adapted to releasably engage said reel.

2. The structure defined in claim 1 and wherein said reel housing is open at one end and provided with a closure at said one end; said reel being removably mounted in said housing and being bodily insertable and removable by way of said openable end.

3. The structure defined in claim 2 and wherein said lower end portion is tapered downwardly and is generally conical, said upper portion being cylindrical in cross-section, said reel housing being likewise cylindrical in cross-section and having bearings, said reel having journals removably and rotatably mounted in said bearings, a portion of the surface of said reel being provided with embossments, and said brake shoe comprising a rubber disk of a size to engage certain ones of said embossments.

4. A fishing device which is usable as a depth finder and also for regulating the amount of the line to be used for fishing in a body of water at a predetermined depth comprising a hollow elongated bobber having its lower end axially weighted and adapted to assume a given position in the water, its upper end substantially open and intermediate portions apertured, a reel mounted in said bobber for rotation therein, a fishing line, the upper end of said line being attached to and reelable on said reel, and friction brake means confined for operation in said bobber and adapted to prevent the reel from turning during the usual cast and to release said reel to turn freely after the cast has been completed and the bobber assumes its intended fishing position, said brake means comprising a float vertically slidabl' in said bobber and movable into friction braking engagement with the reel during the interval of the cast, and disengageable and movable away from the reel when the cast is complete and the bobber comes to rest atop, or substantially so, of the water.

5. The structure defined in claim 4 and wherein said reel is removably mounted in said bobber and is bodily removable from said bobber for line winding and adjusting requirements.

References Cited in the file of this patent

UNITED STATES PATENTS

| | | |
|---|---|---|
| 1,973,028 | Thomas | Sept. 11, 1934 |
| 2,592,411 | Louthan | Apr. 8, 1952 |
| 2,720,720 | Landrum | Oct. 18, 1955 |